United States Patent Office 3,145,081
Patented Aug. 18, 1964

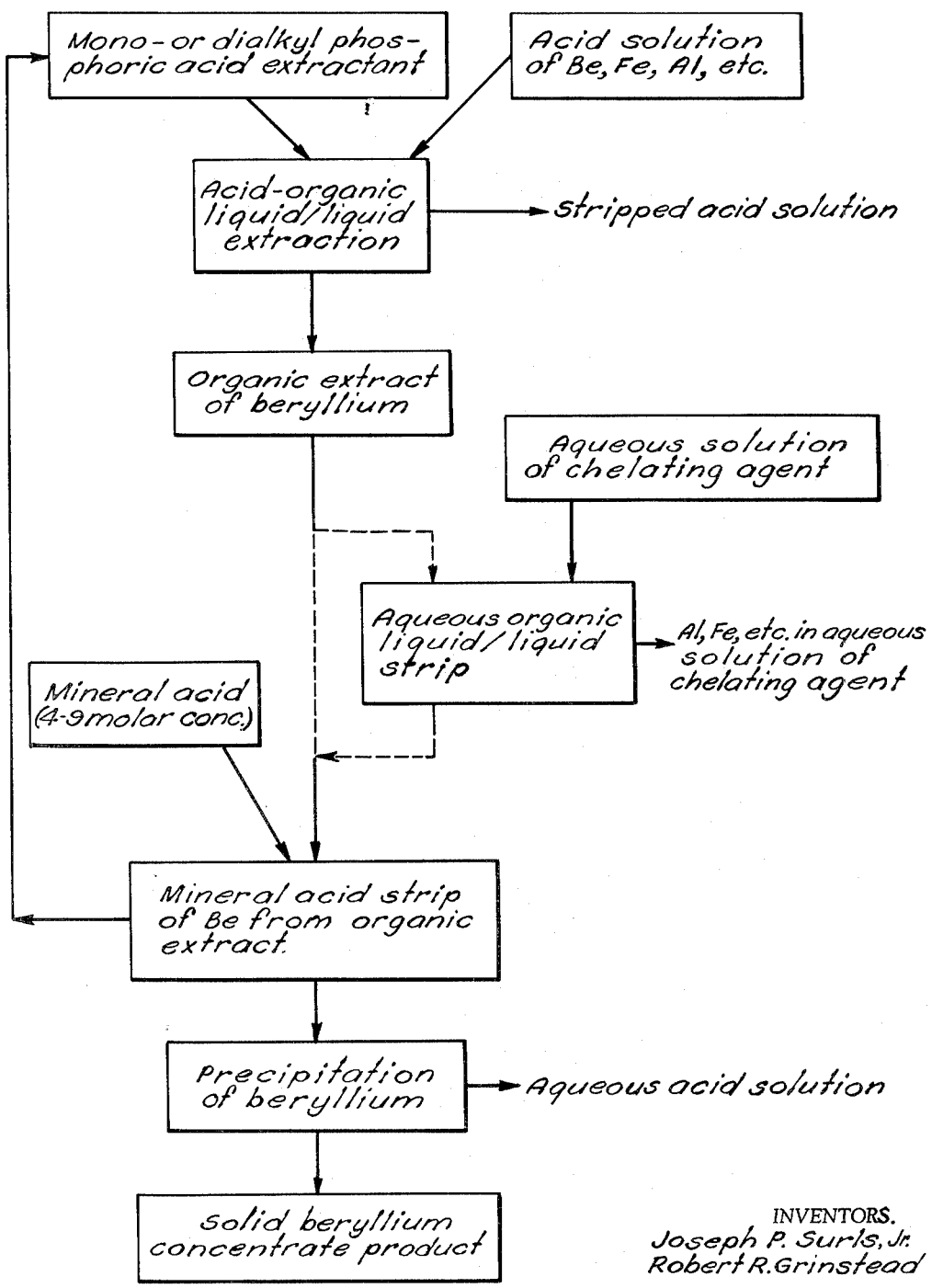

3,145,081
PROCESS FOR CONCENTRATION AND PURIFICATION OF BERYLLIUM VALUES
Joseph P. Surls, Jr., and Robert R. Grinstead, both of Walnut Creek, Calif., assignors to The Dow Chemical Company, Midland, Mich., a corporation of Delaware
Filed Dec. 28, 1961, Ser. No. 162,824
7 Claims. (Cl. 23—183)

This invention relates to a process for the recovery of beryllium values and more particularly is concerned with a new and novel method for the preparation of a relatively pure beryllium concentrate.

In recovering beryllium from its ores, the ore may be directly digested with a mineral acid or first sintered and reacted with certain reagents and then leached with an acid to "open" the ore and dissolve the beryllium values contained therein. With both of these types of initial treatments, an acidic aqueous solution is obtained which contains beryllium and many other anions and cations as impurities. For example, the solution may contain a certain amount of calcium, rare earth, aluminum, iron, sodium and potassium cations along with anions of chloride, fluoride, sulfate or silicofluoride. In this solution the concentration of beryllium may be very low compared to the total concentration of the impurities. In fact, the concentration of the dissolved impurities may be two to ten times greater than the beryllium content. Thus, the recovery of beryllium from the aqueous solutions as a high grade concentrate by conventional practices is a difficult and a costly process.

It is a principal object of the present invention to provide a new and novel method for recovering and concentrating beryllium from any of a wide variety of beryllium containing ores.

It is another object of the present invention to provide a method for the recovery and separation of dissolved beryllium values from aqueous acidic solutions also containing undesirable metallic ion impurities.

It is a further object of the present invention to provide a commercial method for recovering and concentrating beryllium values utilizing a combination of solvent extraction processes.

It is an additional object of the present invention to provide a method for selectively separating iron, aluminum and other metal ion contaminants from beryllium containing solutions.

It is another object of the present invention to provide a commercial method for producing beryllium concentrate wherein ready recovery and recycle of relatively expensive organic extractants used therein is achieved.

These and other objects and advantages will be apparent from the detailed description presented hereinafter and by reference to the accompanying drawing.

The figure in the drawing presents a schematic flow diagram of the general method of the instant invention for preparing a beryllium concentrate.

The instant process for recovering beryllium values dissolved in an aqueous acid solution, such as is obtained by leaching beryllium containing ores for example, is carried out as follows: an acidic leach solution containing beryllium ions is contacted with a mono- or dialkyl phosphate thereby extracting the beryllium from the aqueous phase; the beryllium loaded organic extract is separated from the substantially beryllium free aqueous acid leachate; and, the beryllium values are separated from the organic extract and recovered as a solid concentrate.

Highly preferential extraction of beryllium values into the alkyl phosphate extractant over other metallic ions, e.g., rare earths and aluminum, which may be present in the original acidic leachate, are obtained under the specified operating conditions employed in the instant process. However, if desired, further purification of the metal ion containing organic extract can be achieved by treating this extract with an aqueous solution of a chelating agent which selectively removes aluminum values from the organic phase prior to recovering the beryllium.

The present process is applicable for use with acidic leach liquors resulting from the "opening" of any of a wide variety of beryllium containing ores. To illustrate, leach solutions resulting from the sulfuric acid treatment of beryl ore can be used. Also, beryllium satisfactorily can be recovered from hydrochloric and sulfuric acid leach solutions of fluorspar containing bertrandite and from acid leaching of flotation concentrates of this latter material.

In the liquid-liquid extraction of a beryllium containing acidic leach solution with alkyl phosphate, the pH of the acidic solution is kept low as preferential extraction of beryllium values into the organic extractant is favored by relatively high acid conditions. Preferably the pH of the acidic leachate will be kept within the range of from about 0.4 to about 2. The actual pH employed in a given operation will depend upon the expense of acidifying the solution to the desired low pH and the required extent of aluminum separation. In extremely high acid solutions, i.e., those much lower in pH than indicated hereinbefore, the dissolved beryllium values favor the aqueous phase. If the pH of the acidic leachate is much higher than indicated, coextraction of undesirable quantities of aluminum along with the beryllium results.

If ferric iron is present in the initial acid leachate, this is coextracted into the organic phase along with the beryllium. Undesirable coextraction of ferric ion along with the beryllium can be eliminated if the ferric ion in the acid leach liquors is reduced to the less extractable ferrous state. This readily is accomplished by adding metallic iron, zinc, aluminum, sodium sulfide or bisulfide, sodium hydrosulfite or other reductants to the acid solution whereby the potential of said solution (versus Standard Calomel Electrode) is reduced to at least −0.30 volt.

Temperature is not a critical variable in the alkyl phosphate-acid leach liquor extraction step. For ease of operation ordinarily temperatures ranging from room temperatures, i.e., about 20° C., up to moderately elevated temperatures are employed. Preferably, the extraction will be carried out over a temperature range of from about 25 to about 50° C.

The minimum contact time to be utilized is that whereby the desired quantity of beryllium is removed from the acid leach by the organic extractant. The actual contact time can range from several minutes up to several hours or more. Ordinarily, satisfactory stripping of the beryllium values from the acid leach is obtained at contact times from about 10 to 60 minutes.

Mono- and dialkyl substituted orthophosphoric acids suitable for use as extractants in the instant process are those members wherein the number of carbon atoms present in each alkyl group ranges from about 4 to about 18 or more. Preferably, the alkyl groups each will contain about 6 or more carbon atoms. Alkyl phosphates which have been found to be especially effective are mono-dodecyl phosphoric acid, mono-hexadecyl phosphoric acid and di-octyl phosphoric acid. Mono-hexadecyl phosphoric acid has been found to be particularly useful when used with sulfuric acid leachates from beryl ore.

The alkyl phosphate organic extractant can be used directly to remove beryllium from the acid leachate. However, advantageously this extractant is carried in a suitable solvent or diluent. The minimum requirements for such a carrier are (1) the solvent be insoluble in the aqueous phases contacted therewith, (2) the extractant be soluble in the solvent, and (3) the organic-metal complex be soluble in the solvent. Representative excellent diluents which can be used are kerosene, isopropyl ether, and Stoddard solvents. Other useful diluent materials are aliphatic hydrocarbons, aromatic hydrocarbons, halogenated hydrocarbons, ethers, and petroleum derived materials such as diesel oil, aromatic oils, distillates, various commercial organic solvents, gasoline and petroleum ethers.

Useful concentrations of the organic substituted phosphoric acid extractant in the solvent are from about 0.1 to about 3 molar and preferably is about 1 molar. For example, a solution containing about 0.5 molar weight monododecyl phosphoric acid per liter in kerosene was found to be an effective extractant for removing beryllium from a $H_2SO_4$ leach of beryl ore.

The relative volumes of the extractant solution to aqueous metal value containing solution can vary from an organic/aqueous phase ratio of from about 10 to about 0.1. Preferably, the actual amount of alkyl-substituted phosphoric acid extractant to be employed will be at least the substantially stoichiometric molar equivalent of the moles of metal values to be extracted.

In actual operation the extracting step can be carried out using conventional mixer-settlers, countercurrent extractors and the like in single or multiple stages.

Although high recovery of beryllium is obtained in a single direct contact of the acid leach and organic extractant, substantially complete recovery of beryllium from the aqueous acid solution is realized by multiple contacts in a countercurrent system.

Recovery of the beryllium values from the organic phosphate extractant subsequent to separating this phase from the beryllium poor acid leachate is accomplished by contacting the organic extract with an acid. Preferably mineral acids of from about 4 to 9 molar concentration will be used and desirably mineral acids in which beryllium values precipitate as the corresponding salt, e.g., sulfuric acid, will be employed. However, other acids, such as hydrochloric, nitric, hydrofluoric, etc., in which the corresponding beryllium salt is soluble can be used as stripping agents. With these latter substances, after separating the two liquid phases, the solid beryllium concentrate can be recovered by concentrating the solution or by evaporating it to dryness to obtain the corresponding hydrated beryllium salt.

With more concentrated mineral acid stripping agents than indicated hereinbefore, the beryllium values along with aluminum tend to remain in the organic phase although other dissolved metal impurities are stripped therefrom. Therefore, if desired, prior to recovering beryllium from the organic extract, this extract can be washed with concentrated mineral acid thereby further improving the purity of the resulting beryllium product.

As indicated hereinbefore, sulfuric acid or from about 4 to about 9 molar is a preferred stripping agent as hydrated beryllium sulfate precipitates directly therein. Sulfuric acid of from about 8 to 9 molar provides the optimum stripping since at this acid concentration the stripping coefficient favoring beryllium removal is at a maximum and beryllium sulfate is only slightly soluble in acid of such concentration and therefore can be readily separated from the system by filtration.

The temperature and contact times to be employed in this latter stripping operation will vary somewhat depending upon the particular alkyl phosphoric acid extractant employed in the process. Temperatures in the range of from about room temperature, i.e., about 20° C., up to about 100° C. are operable and contact times of from several minutes to several hours or more can be employed. The particular reaction conditions to be employed for optimum beryllium recovery readily can be determined by one skilled in the art. The following example will serve to illustrate: with monohexadecyl phosphate extractant and about 5 to 9 molar sulfuric acid stripping agent temperatures of from about 40 to about 60° C. and contact times of from about 5 to 60 minutes and preferably from about 30 to about 60 minutes gives optimum beryllium removal from the organic phase. Also, at these conditions, any aluminum that may have been present in the organic phase and subsequently stripped therefrom by the sulfuric acid remains in solution in the acid thereby providing a further purification of the beryllium concentrate.

Ordinarily the minimum amount of acid stripping agent to be employed is about the stoichiometric equivalent needed to react with the metal values present in the organic extract.

If the beryllium recovery process is carried out as set forth hereinbefore beryllium concentrates having relatively small amounts of undesirable metal ion contaminants are produced.

However, if desired, the majority of any such undesirable metal values, e.g., aluminum and iron, which may have been transported into the organic phase during the initial liquid-liquid extraction step can be removed therefrom prior to the recovery of the beryllium values. This readily is accomplished by treating the organic extract, after it has been separated from the original acid leachate, with an aqueous solution containing a water-soluble chelating agent. Aqueous solutions of from about pH 4 to about 8, and preferably of from about pH 5 to about 7, which contain an aqueous-soluble chelator are employed. Contact time ranges from about 5 minutes to an hour or more and ordinarily will be from about 15 to about 60 minutes. Salts of ethylenediaminetetraacetic acid are very satisfactory chelating agents for use in this treatment. Diaminocyclohexanetetraacetic acid salts and diethylenetriaminepentaacetic acid salts also are suitable for use in this operation.

This extraction can be carried out using conventional mixer-settlers, countercurrent extractors and the like in single or multiple stages.

Any of the hereinbefore described alternate purification steps can be used independently or in combination in the instant process.

The resulting beryllium salt products can be used as produced or if desired these can be ignited or calcined and transformed into corresponding beryllium oxide using conventional techniques and processes as are understood by one skilled in the art.

The following examples will serve to further illustrate the present invention but are not meant to limit it thereto.

EXAMPLE 1

A sulfuric acid leach of beryl ore containing about 2.2 grams dissolved beryllium per liter and about 3.8 grams dissolved aluminum per liter was contacted with 0.5 molar hexadecyl phosphoric acid carried in kerosene using a 2-stage countercurrent extractor. In the first stage of the extractor, fresh acid leach liquor was contacted at a temperature of about 40° C. with organic extractant from the second stage. It was then passed into the second stage where it contacted fresh organic extractant at a temperature of about 65° C. The overall volume ratio of organic phosphate to acid leachate was about 1.8. The resulting beryllium poor acid leach liquor had a residual beryllium content of about 0.09 gram per liter. The resulting organic extract contained about 1.6 grams beryllium per liter. This is equivalent to about 96 percent extraction.

The beryllium loaded extract was passed into a one-stage stripper containing an excess of sulfuric acid (about 8 molar concentration) maintained at a temperature of about 65° C. Beryllium sulfate precipitated in the aqueous acidic phase and this along with the substantially beryllium free organic extractant was removed independently from the stripper. As the sulfuric acid was consumed, additional 8 to 9 molar sulfuric acid as required was added to the stripping tank.

Analysis of the resulting solid product indicated this to be substantially beryllium sulfate having a Be/Al ratio of about 11.

EXAMPLE 2

A number of tests were run to demonstrate the effectiveness of various mono- and dialkyl phosphoric acids in extracting beryllium from a beryl ore leach solution. A sample of the leach solution was stirred for a given period of time with approximately an equal volume of 0.5 molar alkyl phosphoric acid carried in a kerosene diluent.

At the conclusion of the run, the organic and aqueous phases were separated and each analyzed for residual beryllium and aluminum contents. Table I, which follows, summarizes the results of these tests.

*Table I*

| Run No. | Organic Phosphoric Acid Extractant (substituent radical) | Test Duration (min.) | Metal Value (Per Cent Extracted) | |
|---|---|---|---|---|
| | | | Be | Al |
| 1 | Hexadecyl | 90 | 87 | 27 |
| 2 | Dodecyl | 90 | 81 | 25 |
| 3 | di-Octyl | 120 | 83 | 39 |
| 4 | Butyl octylphenyl thio | 80 | 57 | |

EXAMPLE 3

A number of tests were carried out evaluating the effect of the acid leach solution pH on the relative extraction of beryllium and aluminum values into alkyl phosphoric acid. The comparison between extractants is based on the separation factor ($Ks$) achieved. This factor $Ks$ is defined as $$Ks = \frac{K \frac{organic}{acid} (Be)}{K \frac{organic}{acid} (Al)}$$

that is the ratio of the distribution coefficients of the two metal ions in the aqueous and organic phases. For these tests, an acid leach solution at a predetermined pH was contacted two times with a given quantity of alkyl phosphoric acid utilizing about equal volumes of the acid leach liquor and 0.5 molar organic extractant, this latter material being carried in kerosene.

The results of this study are summarized in Table II.

*Table II*

| Run No. | Phosphoric Acid Extractant (Alkyl substituent) | Acid Leach pH | $Ks$ |
|---|---|---|---|
| 1 | Hexadecyl | 1.5 | 8.1 |
| 2 | do | 3.5 | 0.8 |
| 3 | Dodecyl | 1.5 | 5.0 |
| 4 | do | 3.5 | 0.9 |
| 5 | Dodecyl | 1.0 | 6.1 |
| 6 | Hexadecyl | 1.0 | 8.7 |
| 7 | Dioctyl | 1.0 | 12.8 |
| 8 | do | 1.5 | 7.4 |

EXAMPLE 4

Fifty milliliters of about 0.5 molar monododecyl phosphoric acid containing about 1.2 grams Be per liter and about 1.3 grams Al per liter were stirred for about 45 minutes with about 25 milliliters of 1 molar aqueous diammonium ethylenediamine-tetraacetic acid while maintaining the pH at about 7. Analysis of the aqueous and alkyl phosphate phases after the stirring was completed indicated substantially no beryllium was present in the aqueous phase. The aluminum content of this aqueous solution was about 0.66 gram per liter. Only about 0.08 gram Al per liter remained in the organic phase.

A second run was made following this same procedure except that only ferric ion (4.5 grams per liter) was initially present in the organic phase. Following the test, the ferric ion concentration of the alkyl phosphate layer was about 0.3 gram per liter. The aqueous solution had a concentration of about 9 grams ferric ion per liter.

EXAMPLE 5

A sample of fluorspar containing bertrandite was leached either with hydrochloric acid or sulfuric acid. The resulting acid leach was contacted with an equal volume of 0.5 mono-dodecyl phosphoric acid in kerosene following the procedures as set forth in Example 2. The results of several extractions carried out on various acid leach solutions are presented in Table III which follows.

*Table III*

| Run No. | Leach Liquor | pH | Extraction Temp | Contact Time, min. | Percent Be Extracted |
|---|---|---|---|---|---|
| 1 | Bertrandite-H₂SO₄ | 0.4 | Rm.[1] | 105 | 43 |
| 2 | Bertrandite-HCl | 0.4 | Rm.[1] | 165 | 40 |
| 3 | Bertrandite-H₂SO₄ | 1.5 | 40 | 75 | 71 |

[1] About 25° C.

In a manner similar to that described for the foregoing examples, di-butyl phosphoric acid can be contacted directly in a mixer-settler with a beryllium containing acid solution of about pH 0.5. The organic phase then can be separated from the acid and agitated with about 6 molar hydrochloric acid to strip the beryllium values therefrom. The beryllium containing aqueous acid solution can be concentrated and the solid beryllium chloride be precipitated therefrom.

A hydrochloric acid leach of a bertrandite ore at a pH about 2 can be contacted with mono-hexyl phosphoric acid at a temperature of about 80° C. The alkyl phosphoric acid phase then can be washed with about 12 molar sulfuric acid. Subsequently the beryllium containing alkyl phosphoric acid extract can be mixed and mechanically stirred with an aqueous solution (pH 5) of diammonium ethylenediamine tetraacetic acid. After separating the aqueous and organic phases, the organic phosphoric acid layer than can be contacted with 8 molar nitric acid thereby stripping the beryllium values from the organic extractant. The aqueous nitric acid phase can be evaporated to dryness to produce the corresponding beryllium nitrate. This product readily can be converted by calcination into a high grade beryllium oxide.

Various modifications can be made in the present invention without departing from the spirit or scope thereof for it is understood that we limit ourselves only as defined in the appended claims.

We claim:

1. A process for recovering beryllium values dissolved in an aqueous acid solution which comprises: (1) contacting a beryllium containing aqueous acid solution of pH from about 0.4 to about 2 with a member selected from the group consisting of mono- and dialkyl substituted orthophosphoric acids wherein the number of carbon atoms present in each alkyl group of said substituted orthophosphoric acid ranges from about 4 to about 18 thereby to extract said beryllium values from said aqueous acid solution into the alkyl phosphoric acid, (2) separating the beryllium poor aqueous acid phase and beryllium-alkyl phosphoric acid extract, (3) and, contacting the beryllium-alkyl phosphoric acid extract with mineral acid thereby to strip the beryllium values from said extract and recovering the beryllium values from said mineral acid.

2. A process for recovering beryllium values dissolved in an aqueous acid solution which comprises: (1) contacting a beryllium containing aqueous acid solution of pH from about 0.4 to about 2 with from about 10 to about 0.1 volume of a member selected from the group consisting of mono- and dialkyl substituted orthophosphoric acids wherein the number of carbon atoms present in each alkyl group of said substituted orthophosphoric acid ranges from about 4 to about 18 thereby to extract said beryllium values from said aqueous acid solution into the alkyl phosphoric acid, (2) separating the beryllium-alkyl phosphoric acid extract from the beryllium poor aqeuous acid solution, (3) contacting said beryllium-alkyl phosphoric acid extract with a mineral acid of from about 4 to about 9 molar concentration thereby stripping the beryllium values from said alkyl phosphoric acid into said mineral acid, the amount of said mineral acid being at least the stoichiometric equivalent of the beryllium values present in said extract, (4) separating said mineral acid and said alkyl phosphoric acid extractant, and (5) recovering beryllium values from said mineral acid.

3. A process for recovering beryllium values from an acid leach solution of a beryllium containing ore which comprises: contacting the acid leach liquor of said ore at pH from about 0.4 to about 2.0 with from about 10 to about 0.1 volume of a member selected from the group consisting of mono- and dialkyl substituted orthophosphoric acids wherein the number of carbon atoms present in each alkyl group of said substituted orthophosphoric acid ranges from about 4 to about 18 thereby to extract said beryllium values from said aqueous acid solution into the alkyl phosphoric acid, (2) separating the beryllium-alkyl phosphoric acid extract from the beryllium poor aqueous acid leach liquor, (3) contacting said beryllium-alkyl phosphoric acid extract with sulfuric acid, said sulfuric acid being from about 4 to about 9 molar concentration and the minimum amount of said sulfuric acid being about the stoichiometric equivalent needed to react with the metal values present in said extract thereby to strip beryllium values from said extract and precipitate the corresponding beryllium salt in the sulfuric acid phase, and (4) separating the precipitated beryllium salt from the sulfuric acid.

4. The process as defined in claim 3 wherein the alkyl phosphoric acid extractant is a member selected from the group consisting of mono-dodecyl phosphoric acid, mono-hexadecyl phosphoric acid and di-octyl phosphoric acid and wherein the acid leach liquor from said ore leaching and said extractant are contacted at a temperature of from about 25 to about 50° C. for a period of from about 10 to 60 minutes.

5. The process as defined in claim 3 wherein the sulfuric acid stripping agent is from about 8 to about 9 molar concentration and the beryllium-alkyl phosphoric acid extract and said sulfuric acid are contacted at a temperature of from about 40 to about 60° C. for a period of from about 30 to about 60 minutes.

6. The process as defined in claim 3 and including the step of treating the beryllium-alkyl phosphoric acid extract with an aqueous solution of a salt of ethylenediametetra-acetic acid having a pH of from about 4 to about 8 prior to stripping the beryllium values from said extract.

7. The process as defined in claim 3 and including the step of igniting the beryllium sulfate and transforming it into beryllium oxide.

References Cited in the file of this patent
UNITED STATES PATENTS

| | | |
|---|---|---|
| 2,110,010 | White et al. | Mar. 1, 1938 |
| 2,148,520 | Windecker | Feb. 28, 1939 |
| 2,859,092 | Bailes | Nov. 4, 1958 |
| 2,902,454 | Moore | Sept. 1, 1959 |